United States Patent [19]
Fink et al.

[11] 3,731,980
[45] May 8, 1973

[54] ANTISKID CONTROL SYSTEM
[75] Inventors: Werner Fink; Dieter Kircher; Jutta Mittelbach, all of Frankfurt, Germany
[73] Assignee: ITT Industries, Inc., New York, N.Y.
[22] Filed: May 10, 1972
[21] Appl. No.: 251,898

[30] Foreign Application Priority Data
May 27, 1971 Germany............P 21 26 391.2

[52] U.S. Cl..............................................303/21 F
[51] Int. Cl. ................................................B60t 8/06
[58] Field of Search....................303/21 F, 21 BE, 303/10

[56] References Cited
UNITED STATES PATENTS
3,674,121  7/1972  Copeland............................303/21 F
3,674,317  7/1972  Mangold.............................303/21 F Primary Examiner—Richard A. Schacher
Attorney—C. Cornell Remsen, Jr. et al.

[57] ABSTRACT

There is disclosed a control valve arrangement for an antiskid control system which substantially eliminates the abrupt pressure buildup on the brake circuit at the end of each antiskid control cycle when the vehicle wheel has reached a certain reacceleration value. A throttle valve is added to a conventional control valve arrangement so that upon achieving the desired reacceleration value the braking pressure gradually builds up on the brake circuit and thereby eliminates interfering signals in the control signals produced by the antiskid electronic control unit and vibrations of the vehicle itself.

7 Claims, 2 Drawing Figures

ANTISKID CONTROL SYSTEM

BACKGROUND OF THE INVENTION

The invention relates to an antiskid control system for motor vehicles which controls the pressure in the wheel brake cylinders during a braking operation by means of a control member controlled by a control value corresponding to given deceleration values of the wheel and/or of the vehicle.

A variety of antiskid control systems are known which operate according to different principles. The essential feature of all known antiskid control systems to prevent a locking of the wheels during the braking of a motor vehicle and, hence, to avoid its undesired consequences which are hazardous to traffic, is to generate a control cycle. The control cycle includes generating an incipient skid condition control signal shortly before the locking of one or more wheels. This control signal is employed to reduce the pressure in the brake circuit. Then during the same control cycle, after the wheel or wheels have reaccelerated to a given value, the pressure in the brake circuit is permitted to build up again. Thus, the antiskid control system can begin another control cycle. The control cycles are preferably adjusted such that throughout the braking operation the rotational speed of the wheels in relation to the translational speed of the vehicle stays within a certain slip range which is favorable for an efficient braking.

Due to the cyclical reduction and buildup of the brake pressure in all known antiskid systems there results mechanical vibrations which release excessive energies which are especially generated by a previous excessive brake pressure.

The incipient skid control signal is also subject to a up process during any succeeding control cycle which renders an exact control difficult due to the generation of interfering signals by the mechanical vibrations which are passed on to the control unit or which involve a delay of the following control cycle by special means for the period of said interfering signals. The mechanical vibrations furthermore are highly disturbing to persons seated in such a vehicle and thereby leads to uncomfortable driving.

SUMMARY OF THE INVENTION

An object of the present invention is to provide an antiskid system for motor vehicles which is provided with some means for effective damping of the disturbing mechanical vibrations and for damping and temporary shortening of the building-up process of the incipient skid control signal.

Another object of the present invention to achieve the above mentioned improvement is to provide a throttle valve actuated by the electronic control unit connected in the pressure medium connection to the brake circuit to control the build up of pressure in the brake circuit at the end of any control cycle.

A feature of the present invention is the provision of an antiskid control system comprising: a brake circuit including at least two wheels; an electronic control unit coupled to at least one of the wheels to produce at least a first control signal indicating an incipient skid and a second control signal indicating a given wheel reacceleration value; a source of driver actuated pressure medium; and a control valve arrangement coupled to the control unit and between the source and the brake circuit, the control valve arrangement being responsive to at least one of the first and second control signals to control the pressure of the pressure medium coupled to the brake circuit; the control valve arrangement including a throttle valve to provide a slow, smooth build up of pressure of the pressure medium in the brake circuit at the end of each control cycle of the antiskid control system.

Another feature of the present invention is the provision in one embodiment of the invention of the throttle valve having a first normally open position and a second throttle position. The throttle valve is connected in the direct pressure medium connection between the pressure medium source and the wheel brake circuit. In the first position of the throttle valve the passage cross section of the throttle valve corresponds to the passage cross section of the brake circuit. In the second or switched position of the throttle valve the passage cross section of the throttle valve has a certain throttling cross section.

Still another feature of the present invention is that where the build up of pressure in the brake circuit is controlled by means of an input valve connected in the pressure medium connection between the pressure medium source and the wheel brake circuit and that where the pressure reduction is controlled by means of an output valve connected in a branch of the pressure medium connection, said branch leading to the reservoir, the throttle valve will be connected in series with respect to the input valve, said input valve having a first normally open position and a second closed position.

A further feature of the present invention is that the above mentioned input valve and throttle valve are simultaneously switched to their second positions. When returning to their first positions, the return of the throttle valve to its first position will be delayed by a certain amount relative to the return of the input valve to its first position. This delayed return of the throttle valve to its first position will be determined by the pressure difference between the pressure of the pressure medium from the source and the pressure as it builds up in the brake circuit, said pressure difference being zero or some given small value to accomplish the objects of the pressure invention.

Sill a further feature of the present invention is the provision in another embodiment of the throttle valve having a first normal throttle position and a second closed position. This throttle valve is connected in the pressure medium connection between the pressure medium source and the pressure medium actuating chamber which effects the building-up and reduction of a separating valve. The throttle valve in its first position controls the movement of the throttle valve to provide the slow, smooth build up of pressure of the pressure medium in the brake circuit.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

At first the embodiment as per FIG. 1 will be described.

Figure 1:
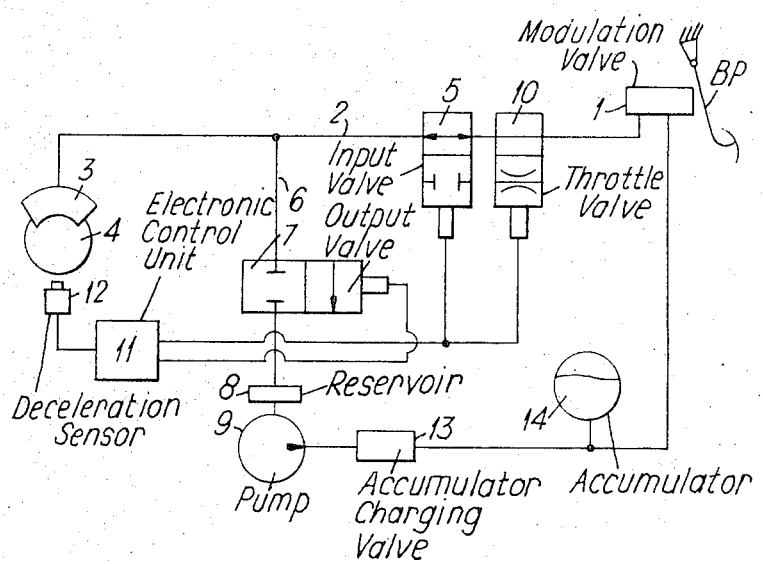
FIG. 1 shows a schematic illustration of an antiskid system in accordance with the principles of the present invention having input and output valves to control the build-up and the reduction of the pressure of the brake pressure medium.

Referring to FIG. 1, pressure medium connection 2 leads from modulation valve 1, such as a power assisted brake or brake booster arrangement, to the brake circuit including at least two wheel brake cylinders of brakes 3 provided at the vehicle wheels 4. Upon actuation by means of brake pedal BP, modulation valve 1 will pass on the pressure of accumulator 14 charged by pump 9 via accumulator charging valve 13, said pressure having been modulated in accordance with the actuation pressure Input valve 5 is connected in pressure medium connection 2 in a manner known per se. In its rest or first position, input valve 5 opens the connection between modulation valve 1 and the wheel brake circuit. In its switched or second position, input valve 5 will interrupt this connection. Between input valve 5 and the wheel brake circuit branch 6 is provided which leads from pressure medium connection 2 into reservoir 8 via output valve 7 which in its rest or first position is closed and which in its switched or second position is open. From reservoir 8 pump 9 will deliver the pressure medium back into accumulator 14 when required through charging valve 13.

Since to a considerable extent the above-mentioned mechanical vibrations and interfering signals are the result of too abrupt a new build-up of brake pressure in the brake circuit during the last phase of a control cycle, the invention provides for the connection of throttle valve 10 in pressure medium connection 2. Throttle valve 10 is connected in series with input valve 5 and modulation valve 1. Throttle valve 10 in the embodiment of FIG. 1 has a first open position and a second throttle position. In its rest or first position throttle valve 10 ensures a completely free passage of pressure medium therethrough while in its second or switched position valve 10 is provided with a throttling cross-section which corresponds to the requirements of the system to achieve mechanical vibration and interfering signal reduction.

Input valve 5, output valve 7 and throttle valve 10 are electromagnetically operated by the output signals of electronic control unit 11 which are generated in accordance with the measured values of deceleration by sensor 12 disposed at wheel 4 and communicating with the input of control unit 11.

With regards to the process of generating dependent output signals in control unit 11 there exist in the prior art many alternative arrangements. Control unit 11 may be any known circuit that provides a first control signal indicative of an incipient skid, a second control signal indicative of the wheel achieving a given reacceleration value and a third control signal, employed only in FIG. 1, indicative of a deceleration value between the deceleration values represented by the first and second control signals.

In the first position of valves 5, 7 and 10 pressure may be built up in the wheel brake cylinder of brake 3 via modulation valve 1. If due to excessive brake pressure wheel 4 tends to lock the first control signal of control unit 11 will cause valves 5, 7 and 10, to switch to their second position. The pressure medium in the section of the pressure medium connection 2 separated from the modulation valve 1 and connected with the wheel brake circuit will expand through branch 6 and valve 7 into reservoir 8. According to the majority of the suggested control processes output valve 7 will be returned into its initial or first position as soon as the deceleration of wheel 4 has reduced by a certain amount. This is accomplished by the third control signal from unit 11. The brake pressure in the brake circuit will be kept at this reduced level for a certain period, namely, until wheel 4 reaccelerates to a given value. While in the known antiskid systems of this type, without throttle valve 10, the pressure in the brake circuit will be abruptly restored to its old value by means of input valve 5 at the cost of the above-mentioned disadvantages as soon as a certain reacceleration of wheel 4 is achieved. In the inventive antiskid system disclosed herein the pressure increase in the brake circuit and, hence, the new deceleration of wheel 4 is brought about in a delayed and smoother manner due to the action of throttle valve 10. Upon achieving of the above-mentioned reaccleration of wheel 4 input valve 5 returns into its first position in the known manner and throttle valve 10 will stay in its second position for a certain period of time, or until there results a certain pressure difference across throttle valve 10. It is only when the pressure in the brake circuit has gradually achieved the pressure determined by modulation valve 1 that throttle valve 10 will switch into its initial or first position.

Figure 2:
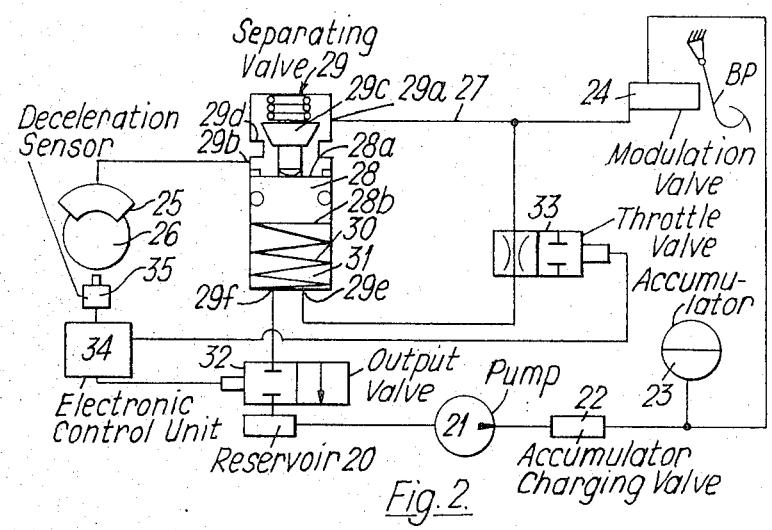
FIG. 2 shows a schematic illustration of an antiskid system in accordance with the principles of the present invention incorporated in a brake system of the pump-accumulator type and having a separating valve to control the build-up and the reduction of the pressure of the brake pressure medium.

FIG. 2 shows the schematic illustration of the inventive control valve arrangement including a throttle valve in an antiskid system and brake system of another type.

Pump 21 sucks pressure medium from reservoir 20 and charges accumulator 23 via accumulator charging valve 22. Accumulator 23 is connected with the input of modulation valve 24, such as a power assisted brake or brake booster arrangement, operated by means of brake pedal BP. The output of modulation valve 24 is connected by pressure medium connection 27 with the wheel brake cylinder of brake 25 disposed at wheel 26. Separating valve 29 is connected in connection 27. Valve 29 includes a pressure medium input 29a and a pressure medium output 29b separated by a valve member 29c and valve seat 29d. Member 29c is moved mechanically and/or by pressure medium. As illustrated plunger 28 in chamber 31 is mechanically connected to member 29c. Pressure medium is coupled into chamber 31 by control input 29e and removed from chamber 31 by control output 29f. Since various forms of separating valves are known in the prior art, one embodiment of separating valve 29 has b-en shown only in outline.

Plunger 28 now is held in its initial or first position by means of a spring 30. When plunger 28 is in its initial position, the pressure medium connection 27 between modulation valve 24 and the wheel brake circuit has the smallest volume possible. Front surface 28a of plunger 28 keeps valve member 29c in lifted position with regard to valve seat 29d. Chamber 31, in which spring 30 is located, which is confined by rear surface 28b of plunger 28. Control output 29f of chamber 31 is connected with reservoir 20 by means of output valve 32 which in its rest or first position is closed and which in its second or switched position is open. Furthermore, chamber 31 is connected with either the output or the input of the modulation valve 24 by means of control input 29e and throttle valve 33 having as its first or rest position a throttle position and as its second or switched position a closed position. Output valve 32 and throttle valve 33 are electromagnetically operated by means of the first and second control signals of electronic control unit 34 whose input is connected with deceleration sensor 35 disposed at wheel 26. Control unit 34 generates first and second control signals which are identical to the first and second control signals generated by control unit 11 of FIG. 1.

The accumulator pressure acting on the input of modulation valve 24 will be passed on modulated through pressure medium connection 27 and separating valve 29 in its first position to the wheel brake circuit upon the onset of a braking operation.

The pressure built up in the chamber 31 of valve 29 through throttle valve 33 being in its first position will be applied to surface 28b of plunger 28. This pressure will cooperate with the force of spring 30 to act against the brake pressure acting on front surface 28a of plunger 28 and thereby maintain valve 29 in its first position. If wheel 26 tends to lock output valve 32 and throttle valve 33 will be switched into their second position by means of the first control signal emitted by control unit 34. Thus, pressure medium will leave chamber 31 and will flow into reservoir 20. No additional pressure medium will be supplied to chamber 31 since throttle valve 33 is closed. The brake pressure acting on front surface 28a of plunger 28 will displace plunger 28 against the reduced pressure of chamber 31 so that valve member 29c is closed against valve seat 29d. By this action the volume of the pressure medium connection 27 between separating valve 29 and the wheel brake circuit will be increased and, hence, the pressure medium is expanded. Output valve 32 and throttle valve 33 will return to their initial or first position upon occurrence of the second control signal from control unit 34. The pressure in the brake circuit is kept constant until throttle valve 33 returns into its rest or first position. Because of the throttled pressure increase in chamber 31 as a result of valve 33, plunger 28 will slowly and smoothly return into its initial or first position and open the separating valve 29.

Due to the throttled pressure increase in chamber 31 of valve 29 as controlled by throttle valve 33, plunger 28 will not abruptly return into its initial position. Thus, disturbing mechanical vibrations will be effectively damped and the building-up process of the incipient skid control signal will be damped and shortened.

While we have described above the principles of our invention in connection with specific apparatus it is to be clearly understood that this description is made only by way of example and not as a limitation to the scope of our invention as set forth in the objects thereof and in the accompanying claims.

We claim:
1. An antiskid control system comprising:
a brake circuit including at least two wheels;
an electronic control unit coupled to at least one of said wheels to produce at least a first control signal indicating an incipient skid and a second control signal indicating a given wheel reacceleration value;
a source of driver actuated pressure medium; and
a control valve arrangement coupled to said control unit and between said source and said brake circuit, said control valve arrangement being responsive to at least one of said first and second control signals to control the pressure of the pressure medium coupled to said brake circuit;
said control valve arrangement including
a throttle valve to provide a slow, smooth buildup of pressure of the pressure medium in said brake circuit at the end of each control cycle of said antiskid control system.
2. A system according to claim 1, wherein
said throttle valve has a first normally open position and a second throttle position, said throttle valve responding to said first control signal to switch from said first position to said second position and said throttle valve switching from said second position to said first position at a time delayed with respect to the generation of said second control signal.
3. A system according to claim 2, wherein
said delayed time is determined by the pressure buildup of said pressure medium in said brake circuit to a given value of pressure difference with respect to the pressure of said pressure medium from said source.
4. A system according to claim 1, wherein
said throttle valve has a first normal throttle position and a second closed position, said throttle valve responding to said first control signal to switch from said first position to said second position and to said second control signal to switch from said second position to said first position.
5. A system according to claim 1, wherein
said control valve arrangement includes
said throttle valve having an output and an input connected to said source, said throttle valve having a first normally open position and a second throttle position, said throttle valve responding to said first control signal to switch from said first position to said second position and said throttle valve switching from said second position to said first position at a time delayed with respect to the generation of said second control signal, and
an input valve having an input connected to said output of said throttle valve and an output connected to said brake circuit, said input valve having a first normally open position and a second closed position, said input valve responding to said first control signal to switch from said first position to said second position and to said second control signal to switch from said second position to said first position,
said delayed time of switching said throttle valve with respect to the actuation of said input valve by said second control signal providing said slow, smooth buildup of pressure of the pressure medium in said brake circuit.

6. A system according to claim 5, wherein
said control unit produces a third control signal indicating a deceleration intermediate said incipient skid and said given wheel acceleration; and
said control valve arrangement further includes
an output valve having an input coupled to said brake circuit and an output to return said pressure medium to said source, said output valve having a first normally closed position and a second open position, said output valve responding to said first control signal to switch from said first position to said second position and to said third control signal to switch from said second position to said first position.

7. A system according to claim 1, wherein
said control valve arrangement includes
a pressure medium controlled separating valve having an input and an output connected between said source and said brake circuit, a pressure medium control input and a pressure medium control output, said separating valve having a first normally open position and a second closed position,
said throttle valve having an input connected to said source and an output connected to said control input, said throttle valve having a first normal throttle position to maintain said separating valve in its first position and a second closed position, and
an output valve having an input coupled to said control output and an output to return said pressure medium to said source, said output valve having a first normally closed position to cooperate with said throttle valve in said first position to maintain said separating valve in its first position,
both of said output and throttle valves responding to said first control signal to switch from their first position to their second position and as a result switch said separating valve to its second position and responding to said second control signal to switch from their second position to their first position and as a result of the throttling effect of said throttle valve provide a slow, smooth switching of said separating valve from its second position to its first position and thereby provide said slow, smooth buildup of pressure of the pressure medium in said brake circuit.

* * * * *